Figure 7:
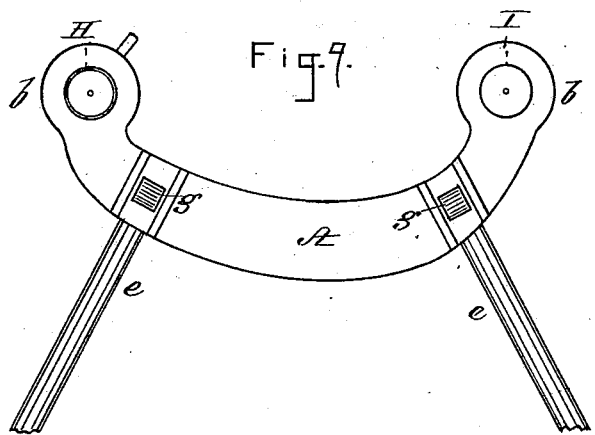

(No Model.)  3 Sheets—Sheet 1.
C. H. DODD.
MACHINE FOR GROOVING SHAFTS, AXLE JOURNALS, &c.
No. 361,677.  Patented Apr. 26, 1887.
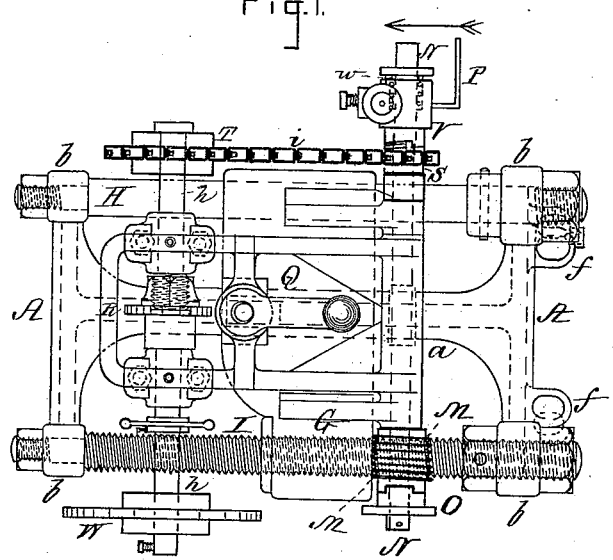
WITNESSES.
W. P. Clough.
H. W. Stearns.
INVENTOR.
Charles H. Dodd,
pr Norman W. Stearns,
Atty (No Model.) 3 Sheets—Sheet 2.
C. H. DODD.
MACHINE FOR GROOVING SHAFTS, AXLE JOURNALS, &c.
No. 361,677. Patented Apr. 26, 1887.
Fig. 3.
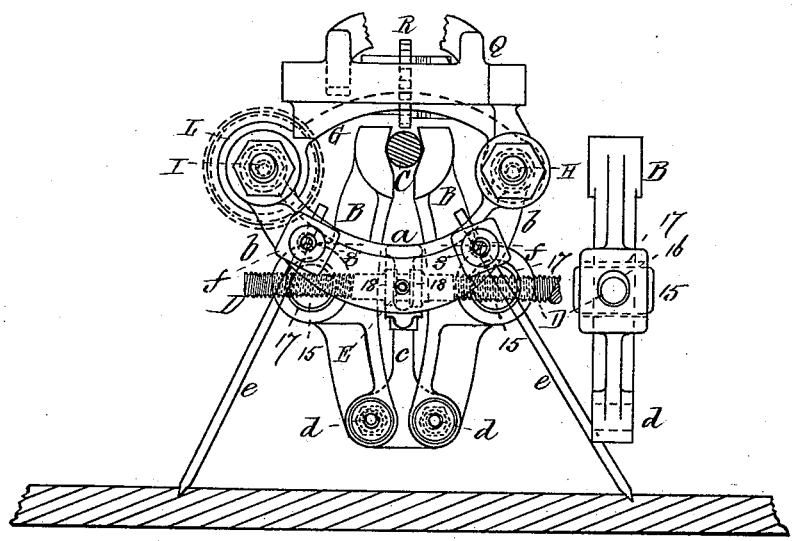
Fig. 4.
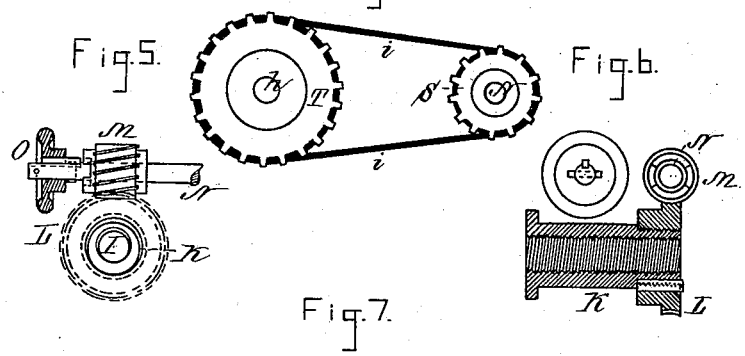
Fig. 5. Fig. 6.
Fig. 7.
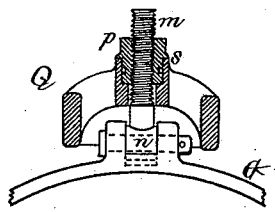
WITNESSES.
W. P. Clough.
H. W. Stearns.
INVENTOR.
Charles H. Dodd,
pr Norman W. Stearns,
Atty.
N. PETERS, Photo-Lithographer, Washington, D. C.

(No Model.) 3 Sheets—Sheet 3.

C. H. DODD.
MACHINE FOR GROOVING SHAFTS, AXLE JOURNALS, &c.

No. 361,677. Patented Apr. 26, 1887.

WITNESSES.
H. W. Stearns
W. P. Clough

INVENTOR.
Charles H. Dodd,
pr N. W. Stearns
Atty.

UNITED STATES PATENT OFFICE.

CHARLES H. DODD, OF BOSTON, MASSACHUSETTS, ASSIGNOR TO HIRAM G. FARR, OF SAME PLACE.

MACHINE FOR GROOVING SHAFTS, AXLE-JOURNALS, &c.

SPECIFICATION forming part of Letters Patent No. 361,677, dated April 26, 1887.

Application filed November 4, 1885. Serial No. 181,869. (No model.)

*To all whom it may concern:*

Be it known that I, CHARLES H. DODD, of Boston, in the county of Suffolk and State of Massachusetts, have invented a Machine for Channeling or Grooving Axle-Journals, and for Splining Shafting, &c., of which the following is a full, clear, and exact description, reference being had to the accompanying drawings, making part of this specification, in which—

Figure 8:
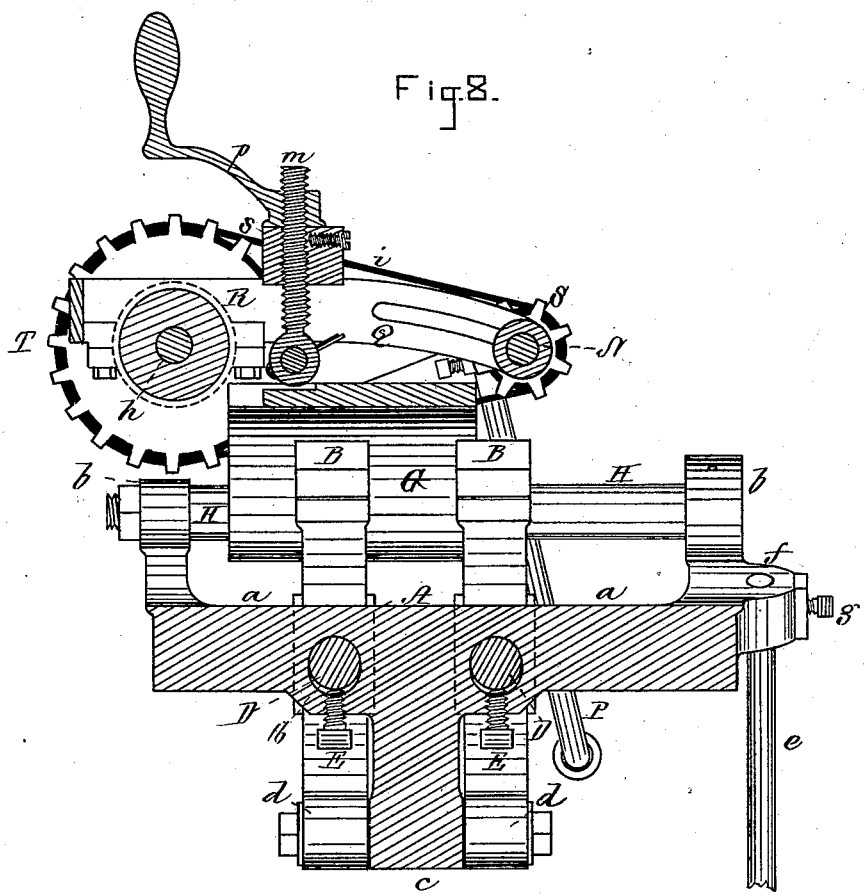

Figure 1 is a plan of my grooving-machine. Fig. 2 is a side elevation of the same. Fig. 3 is an end elevation; Figs. 4, 5, 6, and 7, details to be referred to. Fig. 8 is a vertical longitudinal section, and Fig. 9 an end elevation, of the supporting-frame, the scale of Figs. 8 and 9 being enlarged.

The special aim of this invention is to afford the best facilities for milling or cutting out grooves or channels in the journals of vehicle-axles for the reception of a lubricant to reduce to a minimum the friction between the journals and boxes or bearings of wheels revolving thereon, my object also being to cut the splines of machine-shafting.

The principal features employed by me in the construction of the machine herein referred to are, to wit, a frame provided with jaws, by which it may grasp and be connected with an axle, and adjustable legs for holding it when so connected; a carriage traveling over said frame; a rotary serrated cylindrical cutter having its bearings in a tool-holder pivoted to said carriage; a shaft which is operated by a crank and performs three functions—viz: serves as a pivot, on which the cutter-holder vibrates; drives the rotary cutter, and feeds the sliding carriage in a longitudinal direction, and simultaneously therewith the rotating cutter, throughout the length of the groove—the novelty of this invention consisting, broadly, in some of the foregoing elements, and in certain specific combinations thereof, hereinafter to be fully described, by means of which the machine is adapted to properly and advantageously perform the class of work for which it was designed.

In the said drawings, A represents a metal frame consisting of a central horizontal portion, $a$, terminating at each end in two arms, $b\ b$, rising vertically therefrom, and with a central projection, $c$, extending down from the bottom of the horizontal portion $a$, the top of each arm, $b$ being provided with a socket.

B B B B are two pairs of jaws, pivoted at their lower ends, $d$, to the projection $c$, one jaw of each pair being located on each side of the horizontal portion $a$ of the frame. These jaws are intended to grasp and hold onto the journal of the axle C, to be grooved, in order that the machine may be supported thereby while the cutter is performing its work, two adjustable legs, $e\ e$, having their lower ends pointed, being employed to preserve the frame in its proper position when secured by the jaws to the axle. These legs consist of cylindrical rods passing downward and outward through ears $f\ f$, formed in the outer corners of the frame, and said legs are slid therein till their pointed ends come to a firm bearing in the ground or floor, and are held when adjusted by clamp-screws $g\ g$, Figs. 2 and 3.

Each pair of jaws has a horizontal rod, D, provided with a right and left screw-thread passing through screw-plugs 15, set in the two jaws of the pair, oval openings 16, of a larger size than the diameter of the screw-plug, being formed in the jaws to allow of the movement of said plugs therein, and oval openings 17 through the jaws, (at right angles to the openings 16,) of larger size than the diameter of the screw-rod D, being also formed to allow of the traverse of the jaws in arcs of circles when vibrated on their pivots, the turning of the rod D by a wrench, cross-bar, or other device causing the two jaws of a pair to open away from or close toward each other to grasp axles or shafts of different diameters, the amount of this movement of each jaw being the same, and each pair of jaws being held in its locking position by a set-screw, E, having its end turned into the space between two annular flanges, 18, formed on the screw-rod D.

By securing the screw-rod D to the frame A substantially in the manner shown no longitudinal movement thereof is permitted, and it is insured that whatever the size of the shaft being operated upon the cutter R shall always be properly centered relatively to the shaft, this centering being accomplished as the jaws are clamped to the shaft. Were this screw-shaft not secured against longitudinal movement, while it would simultaneously operate the jaws, it would not of necessity (as now) cause them to so move as to properly center the cutter relatively to the shaft; and in a machine partly or principally supported upon legs this is very important.

G is a carriage intended to traverse back and forth over the frame A upon two horizontal parallel rods, H I, passing through a pair of sockets formed in the lower ends of the carriage and the sockets of the four arms $b\ b$ of the frame, one rod, H, being smooth and serving as a guide, and the other, I, provided with a screw-thread which passes through a hollow screw-sleeve, K, located loosely and free to revolve within a lower-projecting ear of the carriage G, said hollow sleeve having secured thereto a worm-wheel, L, which, when the carriage is to be fed, is rotated by a worm-pinion, M, which slides upon the contiguous end of a horizontal shaft, N, and is locked by a clutch, O, secured to said shaft, the pinion M being thrown out of gear with the clutch and worm-wheel L when the carriage is not to be fed—$i.\ e.$, at the time the cutter is commencing to form the groove and is descending to its bottom. The shaft N has secured to its other end a crank, P, for the application of hand-power thereto, the revolution of this shaft through the connections just described causing the carriage to be fed on the rods H I back and forth over the frame.

The shaft N, besides feeding the carriage G, also serves as a pivot for connecting the cutter-holder Q to the carriage and allowing it to be moved slightly in a vertical direction to give the cutter R its necessary rise and fall in forming a groove. The shaft N also drives the cutter-shaft and rotates the cutter by means of connections now to be described.

Within bearings in the forward end of the cutter-holder Q is located a horizontal shaft, $h$, parallel to the driving-shaft N, and having the cutter-wheel centrally secured thereon, said cutter being of cylindrical form and having its periphery serrated or provided with teeth. On the end of the shaft N to which the crank P is secured is keyed a sprocket-wheel, S, and the contiguous end of the cutter-shaft $h$ also carries a sprocket-wheel, T, while over the two wheels S T is an endless sprocket-chain, $i$, Figs. 1 and 4, the turning of the crank P by hand in the direction of the arrow imparting rotary motion to the serrated cutter.

To prevent tampering with the machine and the liability of revolving the shaft N in the opposite direction, I employ a clutch, V, one portion of which is formed on the sprocket S and the other sliding upon the shaft, and pressed by a spring, $w$, into contact therewith to arrest the revolution of the shaft in a direction contary to the arrow; but as this forms no part of my invention and is well known it needs no further description.

To adjust the height of the cutter-wheel R to the surface of the journal to be grooved, I employ the following device, by which it is also fed downward: $m$ is a screw passing vertically through a nut, $s$, secured in the top of the tool-holder Q, and having an enlargement, $n$, at its lower end, which is fastened between two lugs rising from the carriage G. By turning a nut-wrench, $p$, around the vertical screw-shaft $m$ the height of the cutter is adjusted to conform to the height and diameter of the journal to be grooved, after which, by continuing to manipulate said wrench, the cutter is fed down to the bottom of the groove as fast as the metal is removed thereby.

In commencing to cut a groove after the frame is properly secured to the axle, the carriage is located in such position that the cutter will begin to act upon the journal where the inner end of the groove is to be formed, and while the cutter is descending to the bottom of the groove the worm-pinion M is not in gear with the worm-wheel L, and consequently no feed of the carriage takes place; but after the cutter arrives at the bottom of the commencement of the groove the carriage (with the cutter) may be fed toward the operator by turning the crank P after the pinion M is slid into gear with the wheel L. To the end of the cutter-shaft opposite that where the sprocket-wheel T is secured is keyed a balance-wheel, W, provided with a crank, by which the carriage is returned to its original position for the cutter to commence another groove, this means of returning the carriage and cutter being more expeditious than by operating the crank P on the driving-shaft N.

I am aware that it is old to support machines for cutting key-seats entirely upon the shafts on which they operate by clamping the frame which carries the cutter to said shaft; but I have found it desirable and advantageous to employ a supporting device which will relieve the shaft from the weight of the machine, and thus remove danger of warping or bending the same, and which may be operative in whatever position the machine may be used.

To feed the carriage rapidly forward (away from operator) to starting-point of groove, the clutch O must be thrown into gear with the worm-pinion M and the crank P revolved. The clutch O is out of gear when the cutter-wheel is feeding down to the bottom of the groove—as during this operation the carriage is not to be fed—the feed downward of the cutter being, as previously stated, accomplished by turning the nut-wrench $p$ on the screw-shaft $m$. The crank P is turned in the direction of the arrow when cutter arrives at the bottom of the groove and the carriage is to be fed toward operator.

I claim—

1. In a machine for cutting grooves in shafts, the combination, with a frame carrying the cutter and cutter-operating devices, and means, substantially as described, for securing said frame to the shaft to be grooved, of legs $e$, supported in said frame and adapted to rest upon the floor, and means for adjusting said legs in the frame, whereby the frame may be supported and steadied independently of the shaft operated upon whatever the position of the latter, substantially as set forth.

2. In combination, the shaft N, with its crank P, worm-pinion M, sliding thereon, and clutch O, secured thereto, a frame, A, having jaws B B, for securing it to an axle, a screw-rod, I, and guide-rod H, and a carriage, G, having a screw-sleeve, K, and worm-wheel L, constructed to operate substantially as and for the purpose specified.

3. In a machine for grooving journals of axles and splining shafting, the combination, with the pair of jaws B B, supported substantially as described, provided with plug 15 and openings 16 and 17, at right angles to each other, of the regulating screw-rod D, and set-screw E, as and for the purpose set forth.

4. The tool-holder Q, with its nut $s$, screw $m$, and nut-wrench $p$, in combination with the carriage G, cutter-shaft $h$, and cutter R, operating substantially as described.

5. In a machine for cutting grooves in shafts, the combination of the supporting-frame A, the cutter mounted therein, the cutter-operating mechanism, the jaws carried by the frame adapted to grip the shaft to be grooved, and means supported in the frame for simultaneously moving the jaws to and from each other to fit shafts of different sizes, substantially as set forth.

6. In a machine for cutting grooves in shafts, the combination of frame A, the cutter mounted therein, the cutter-operating mechanism, pivoted jaws adapted to grasp the shaft being operated upon, the oppositely-threaded screw-rod D, screw-threaded plugs 15, with which the screw-rod engages, seated in openings of larger size than the plugs, whereby the jaws may swing upon their pivots without rod D and plugs 15 binding, substantially as described.

7. In a machine for cutting grooves in shafts, the combination of frame A, the cutter, mechanism for rotating the cutter, mechanism for feeding the cutter longitudinally of the shaft, and a clutch mechanism whereby the feeding mechanism may be connected with or disconnected from the power-shaft while the cutter-rotating mechanism is in operation, substantially as set forth.

8. In a machine for cutting grooves in shafts, the combination of frame A, the cutter, mechanism for rotating the cutter, mechanism for feeding the cutter longitudinally of the shaft, a clutch interposed between the power-shaft and the feeding mechanism, and means for forcing the cutter more deeply into the groove, substantially as set forth.

Witness my hand this 27th day of October, 1885.

CHARLES H. DODD.

In presence of—
N. W. STEARNS,
JAS. W. CHAPMAN.